(12) United States Patent
Behera et al.

(10) Patent No.: US 12,182,144 B1
(45) Date of Patent: Dec. 31, 2024

(54) INNOVATIVE DISCLOSURE DOCUMENT EVALUATION AND COMPLIANCE SYSTEM AND METHOD

(71) Applicant: Morgan Stanley Services Group Inc., New York, NY (US)

(72) Inventors: Anshuman Behera, Kearny, NJ (US); Sujit Eapen, Plainsboro, NJ (US); Vidhan Dhagai, Mumbai (IN); Debi Hota, Kearny, NJ (US); Shrikant Patil, Mumbai (IN); Raka Rajanigandha, Jersey City, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/774,195

(22) Filed: Jul. 16, 2024

(51) Int. Cl.
*G06F 16/2457* (2019.01)

(52) U.S. Cl.
CPC .............................. *G06F 16/24578* (2019.01)

(58) Field of Classification Search
CPC ................................................. G06F 16/24578
See application file for complete search history.

*Primary Examiner* — Hau H Hoang
(74) *Attorney, Agent, or Firm* — Leason Ellis LLP

(57) ABSTRACT

In one or more implementations, a computer-implemented system and method are provided for assessing relevance and accuracy of confirmation documents with respect to disclosure materials associated with completed activity.

20 Claims, 9 Drawing Sheets

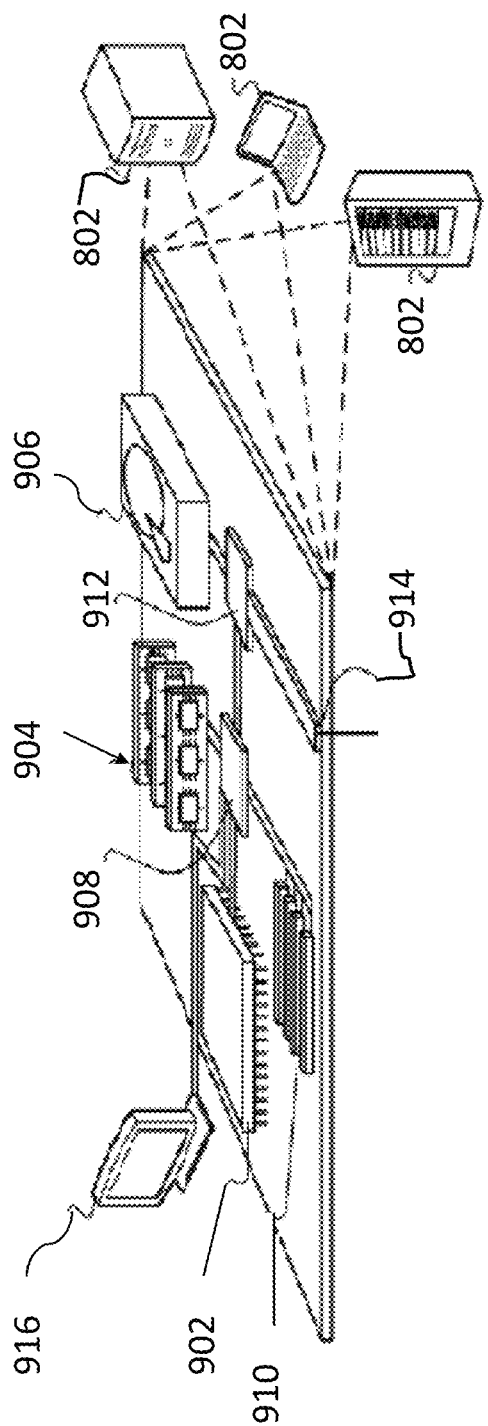

INNOVATIVE DISCLOSURE DOCUMENT EVALUATION AND COMPLIANCE SYSTEM AND METHOD

FIELD OF THE DISCLOSURE

The present disclosure relates, generally, to information technology and, more particularly, to technological solutions to disclosure material evaluation and compliance information.

BACKGROUND OF THE DISCLOSURE

Trade-specific disclosures include information regarding trade activity, including conditions and disclaimers that are associated with a particular security or product which can often be complicated. Following trade activity, regulations can require a confirmation document be submitted that includes information associated with the trade, including such conditions and disclaimers. Determining what information to include in a confirmation document and assessing the accuracy and relevance of such information can be problematic, at least in part due to various conditions such as when the trade activity occurred, the volume of quantities, or other reference data needed to be included in the confirmation document. When dealing with high volume trading, over 1.5 million confirmation documents get produced.

Unfortunately, a lack of transparency regarding processes associated with generating confirmation documents precludes an ability to determine whether such documents are accurate and include relevant (or, conversely, irrelevant) information. Occasionally, retroactive auditing occurs trades that may have been within the previous seven years, and the lack of transparency associated with generating respective confirmation documents can be problematic. This can be especially the case where a problem associated with past trade confirmation documents is discovered that resulted in hundreds of thousands or more improper confirmation documents being inaccurate or omitting information.

It is in regard to these and other problems in the art that the present disclosure is directed.

SUMMARY OF THE DISCLOSURE

In one or more implementations of the present disclosure, a computer-implemented system and method are provided for assessing relevance and accuracy of confirmation documents with respect to disclosure materials associated with completed activity. At least one computing device receives electronic information associated with a confirmation document, which includes information representing at least one transaction disclosure. The electronic information associated with the confirmation document is processed and a first query to be transmitted to at least one model is generated. Thereafter, a first relevance score representing a correlation of the electronic information associated with the confirmation document with information received from the model in response to the transmitted first query is calculated. Knowledge base information, which is stored in at least one database associated with each of a plurality of transaction disclosures corresponding to the electronic information associated with the confirmation document, is accessed and processed, and a second query to be transmitted to at least one model is generated. At least one computing device calculates a second relevance score representing a correlation of the electronic information associated with the confirmation document with information received from the model in response to the transmitted second query. Historical information stored in at least one database associated with each of a plurality of historical records corresponding to the electronic information associated with the confirmation document is accessed and processed and a third query to be transmitted to at least one model is generated. A third relevance score representing a correlation of the electronic information associated with the confirmation document with information received from the model is calculated in response to the transmitted third query. Respective weighting factors are assigned to each of the first relevance score, the second relevance score, and the third relevance score, which are aggregated to generate a weighted relevance. As a function of the weighted relevance, information representing at least one of relevance and accuracy of the confirmation document is generated and transmitted to at least one other computing device.

In one or more implementations, generating at least one of the first query, the second query, and the third query includes retrieval-augmented generation and prompt engineering.

In one or more implementations, generating at least one of the first relevance score, the second relevance score, the third relevance score, and an overlap score further includes accessing at least one database storing rules sets associated with respective transaction disclosures, and matching at least one rule set and corresponding pseudo code in response to information received in response to determining a degree of overlap of matched rules and rules associated with information in the confirmation document.

In one or more implementations, the at least one database storing rules is a DROOLS engine.

In one or more implementations, assigning the respective weighting factors represents relative rankings of the first relevance score, the second relevance score, and the third relevance score with respect to the information in the confirmation document.

In one or more implementations, the generated information representing the at least one of relevance and accuracy of the confirmation document includes a directive representing no further evaluation of the confirmation document is needed, review by an operations team and a business team is needed, or review by an operations team, a business team, and a legal team is needed.

In one or more implementations, feedback is received in response to the generated information representing the at least one of relevance and accuracy of the confirmation document.

Using the received feedback, at least one model is updated.

In one or more implementations, at least one of the first query, the second query, and the third query comprises vectors.

In one or more implementations, the at least one transaction disclosure includes information representing at least one of a product, account type, CUSIP, symbol, quantity, and price.

In one or more implementations, the knowledge base information includes a list of transaction disclosures mapped to applicable products and account types.

In one or more implementations, the historical information is formatted in vectors.

In one or more implementations, an interactive dashboard comprising at least one graphical screen control including information associated with the relevance and accuracy of the confirmation document is provided.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIG. 9 is a block diagram illustrating computing resources that are configurable as a form of a microservices platform, in accordance with an example implementation of the present disclosure.

It is noted that the drawings are illustrative and not necessarily to scale, and that the same or similar features may not have the same or similar reference numerals throughout.

DETAILED DESCRIPTION OF CERTAIN EMBODIMENTS OF THE DISCLOSURE

By way of overview and introduction, the present disclosure presents technical method(s) and system(s) that assess relevance and accuracy of confirmation documents with respect to disclosure materials associated with completed trades. Technological solutions are provided to analyze disclosure material benchmarks for determining applicability, correctness, and potential need for revising confirmation documents. The present disclosure includes systems and methods that solve technical problems associated with disclosure assessment, including with regard to specific operations, compliance risk, and efficiency. For example, relevance can be assessed via one or more dynamic weightage algorithms based on an extensive knowledge base and used to generate disclosure relevance scores for disclosure documents.

In one or more implementations of the present disclosure, trade disclosure relevance can be determined by utilizing computational logic capabilities. For example, details of a disclosure document can be converted to vectors and analyzed in connection with information stored a vector database, including those containing information representing previously generated confirmation documents, rules associated with disclosure, a knowledge base including information representing disclosures mapped to applicable product and account criteria, and historical information, at least some of which is maintained in vector form.

Figure 1:
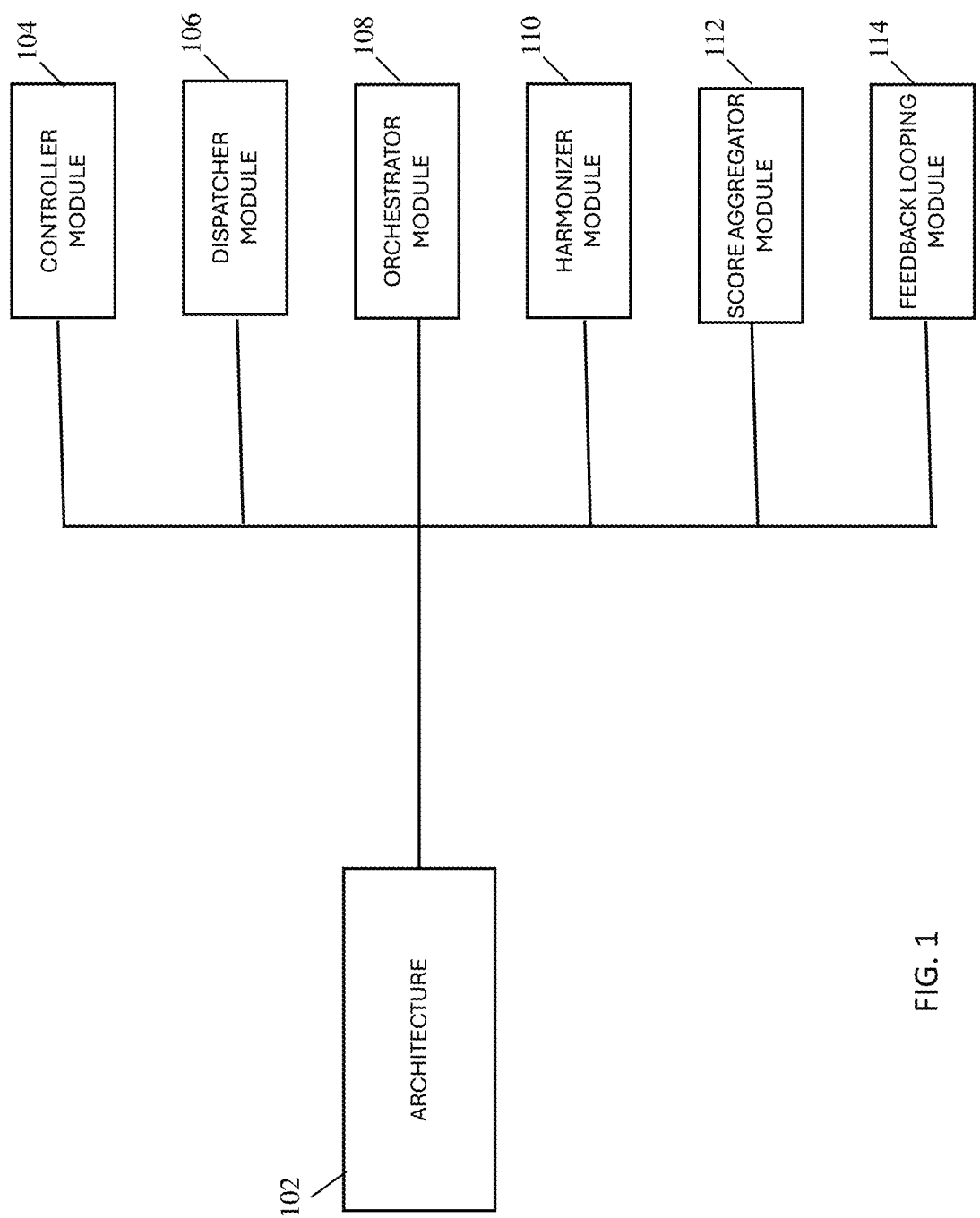
FIG. 1 is a simple block diagram illustrating an example computing hardware and software architecture, in accordance with an example implementation of the present disclosure.

In one or more implementations of the present disclosure, confirmation documents are processed by modules provided via one or more computing devices configured by executing instructions. As used herein, a module refers, generally, to a discrete unit of software and/or hardware that can operate in or as various components of a system or method. Modules can operate independently or in combination, including to provide operations shown and described herein. Referring to FIG. 1, a simple block diagram illustrates an example architecture 102 that includes a controller module 104, dispatcher module 106 orchestrator module 108, harmonizer module 110, score aggregator module 112, and feedback looping module 114. It is to be appreciated that the architecture and modules shown in FIG. 1 are provided for illustrative purposes and that various implementations, including other architectures and modules are supported and covered by the disclosure herein. Operations associated with each respective module are shown and described herein, including with reference to FIGS. 2-7.

In operation, trade information and individual trade disclosures for confirmation documents that are generated within a day are provided. These disclosures can contain detailed information about each trade, including the parties involved, the terms of the trade, and any other relevant information. These data can be processed to assess and process each trade accurately and completely.

In operation, trade information and individual trade disclosures are processed by the orchestrator module 108. The orchestrator module 108 can operate to call a completion application programming interface ("API"), including by using prompt engineering techniques such as "Chain of Thoughts," to query a large language model, for example. In response, a determination can be made of a correlation of (e.g., how closely) the information retrieved in response matches the information in the query. Optionally, once the relevance score is generated, it can be combined with the trade information and individual trade disclosure. This combined data, along with the relevance score, can be fed into an embedding API. Moreover, the data can be stored as embeddings in a vector database.

The embedding API is usable to create embeddings, including a form of data representation in which similar data points can be positioned close to each other in a vector space. The embedding API operates to create embeddings by chunking the provided input data and by storing them into vectors. These vectors are then stored in a database, for example a REDIS database, which can be configured as a high-performance in-memory data structure store that is used as a database cache.

Various information can be received and processed, including for determining one or more conditions, as well as to perform additional operations. As described herein, such operations can occur substantially automatically (e.g., via one or more computing devices) and can include interactions by a user. In certain implementations, sequential aspect(s) can correspond to various progressive stages or levels of an application, though it should be understood that other such segments or areas of an application (e.g., various interfaces or tools) are similarly contemplated. For example, such sequential aspect(s) can be identified with respect to one or more of the interactions can reflect a respective stage or level in connection with processes and interaction(s) that have occurred.

Figure 2:
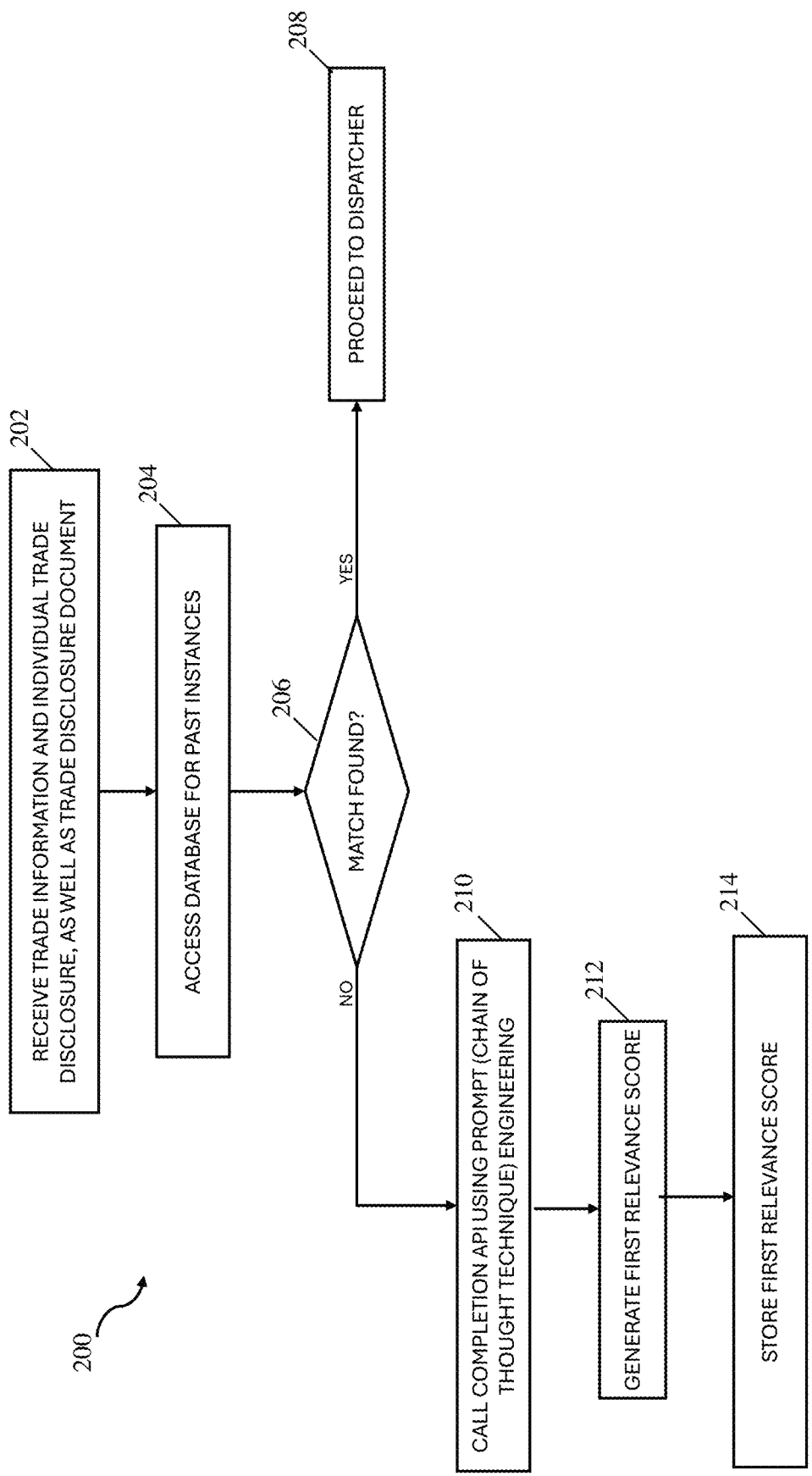
FIG. 2 is a process flow illustrating steps associated with receiving disclosure information, including trade parameters, and with generating a first relevance score.

Referring now to FIG. 2, a process flow 200 is illustrated and describing steps associated with receiving disclosure information, including trade parameters, and generation of a first relevance score. The process 200 can be performed by a processor executing instructions in a computer-readable storage medium, for example via at least controller module 104. For example, trade information details include a product, such as a specific type of financial instrument being traded, an account type, such as the nature of the account involved in the trade, the CUSIP, which is an identifier for securities, the symbol, which is the unique series of letters representing a particular security listed on an exchange, and the quantity and price of the product being traded.

It is to be appreciated that several of the logical operations described herein are implemented as a sequence of computer-implemented acts or program modules running on one or more computing devices. Accordingly, the logical operations described herein are referred to variously as operations, steps, structural devices, acts and modules can be implemented in software, in firmware, in special purpose digital logic, and any combination thereof. It is also to be appreciated that more or fewer operations can be performed than shown in the figures and described herein. Machine learning operations can be implemented using neural networks, which can be implemented on traditional computing systems as well as emerging neuromorphic systems. Furthermore, these operations can be performed in a different order than those described herein.

Continuing with reference to FIG. 2, controller module 104, for example, can operate to receive and process individual trade disclosures (step 202). Moreover, controller module 104 can be configured, as a function of programming statements executed by one or more processors, including to locate and process information associated with individual trade disclosures stored in one or more databases (step 204). Such trade disclosures and associated information can be comprehensive, including details representing a product, account type, CUSIP, symbol, quantity, and price. The controller module 104 can operate to search one or more historical databases for past instances, including confirmation documents, which match current details in a respective trade disclosure, and disclosure combination (step 206). For example, a previous occurrence of a trade that shares a similar (or same) disclosure combination as the current trade can be identified and processed.

Continuing with reference to FIG. 2, if the result of the determination at step 206 is affirmative, indicating a match of a previous one or more previous trade occurrences with information regarding the present disclosure, the process branches to step 208 for further action to be taken by dispatcher module 106. Subsequent actions can be triggered by dispatcher module 106 to provide an efficient, uninterrupted, and seamless workflow. These can include generating a first relevance score, combining data with the first relevance score, creating embeddings, and storing the embeddings (not shown).

Alternatively, if the determination at step 206 is negative, for example the controller module 104 does not find a combination that matches the current trade details and disclosure, the orchestrator module 108 can operate to drive the process further. For example, the process can branch to call a completion API using prompt engineering (step 210). For example, a chain of thought technique can be implemented in step 210. Thereafter, the process continues to step 212 and a first relevance score is generated. Thereafter, the first relevance score is stored (step 214).

The controller module 104 can provide significant roles in enhancing performance. For example, repeated needs to call APIs to determine, for example, relevance of the trade details and disclosure materials can be eliminated by the present disclosure, including as a function of the controller module 104 operations. This not only speeds up the process but also acts as a cost-saving utility. By reducing the number of API calls, the system is more cost-effective, saving resources while still delivering accurate and timely results. Moreover, efficient handling of trade information and disclosure in accordance with the present disclosure has multiple benefits. For example, errors can be minimized or eliminated by ensuring that each trade is accurately matched with its corresponding disclosure. It also maximizes productivity by streamlining the process and eliminating unnecessary steps. Furthermore, it enhances cost-effectiveness by reducing the number of API calls.

Figure 3:
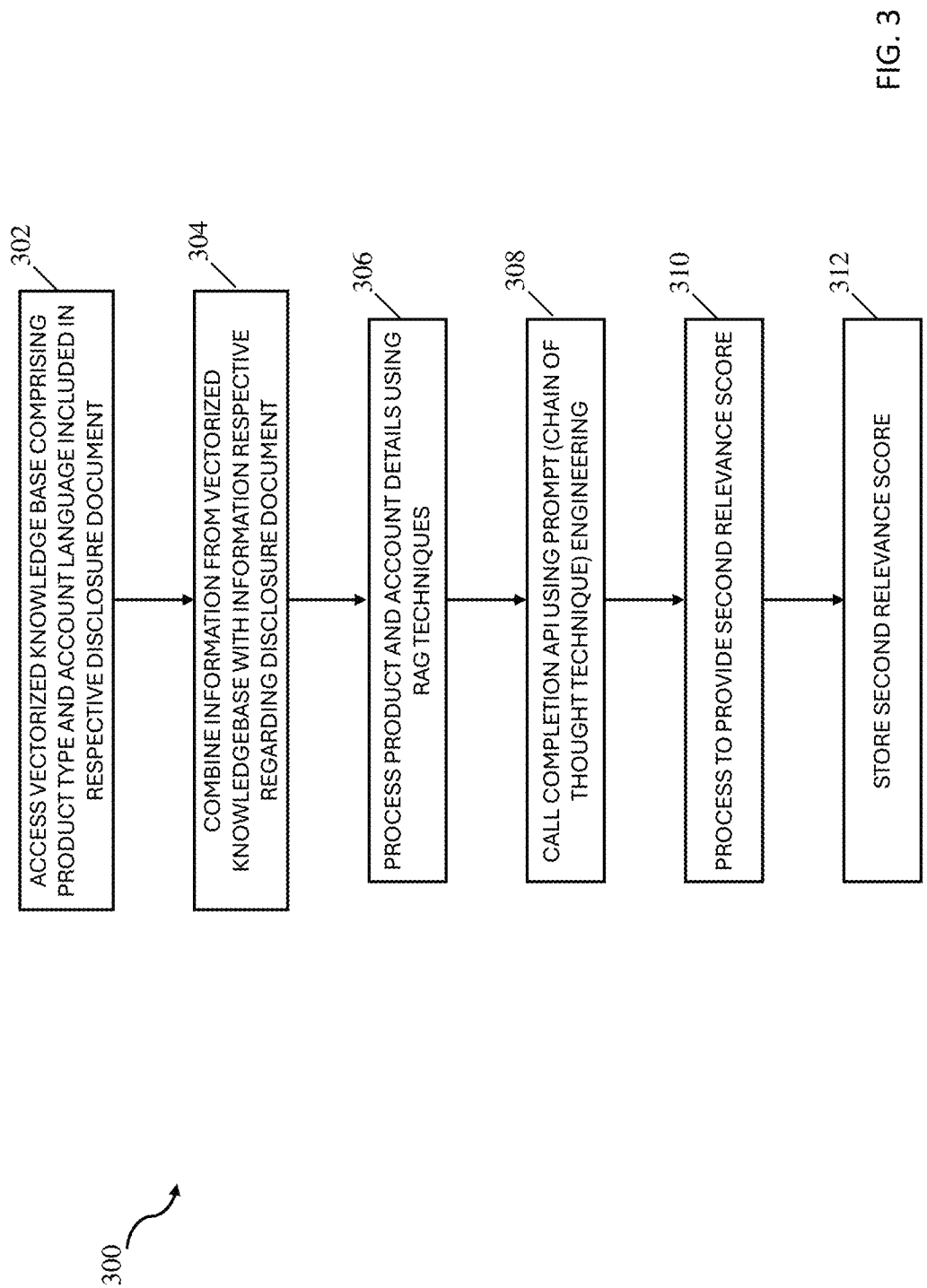
FIG. 3 is a process flow illustrating steps associated with processing information along with an organization's knowledge base to generate a relevance score.

FIG. 3 is a process flow 300 illustrating steps associated with processing information along with an organization's knowledge base to generate a second relevance score. At step 302, the orchestrator module 108 is provided with a one-time vectorized knowledge base of categorized disclosure language, for example, for each product/account type applicability. The product details include information about the specific type of financial instrument being traded, while the account details specify the nature of the account involved in the trade. This information is combined with the organization's knowledge base, which can be a comprehensive repository of information that holds details about the product and all possible combinations of disclosure information for a trade confirmation (step 302). Moreover, the knowledge base can serve as a valuable resource, providing access to a wide range of information to accurately process trades.

In addition to the organization's knowledge base, individual trade disclosures can be provided. Such disclosures contain detailed information about each trade, including the parties involved, the terms of the trade, and any other relevant information. These data are usable to assess and process each trade accurately.

Continuing with reference to FIG. 3, the input data, including the product and account details in the organization's knowledge base, as well as the individual trade disclosures, can be combined (step 304) and processed using the Retrieval-Augmented Generation (RAG) technique (step 306). In one or more implementations of the present disclosure, one or more models have a set threshold and limitation in terms of the number of tokens that can sent, and transmitting thousands of lines of text at a time is not an available option. Accordingly, embeddings can be used and similarity distances can be calculated therefrom. Thereafter, the orchestrator module 108 facilitates the process further by calling a completion API and similar prompting techniques are used to pose a question (step 308). The question is carefully crafted using prompt engineering techniques to ensure that it accurately captures the information required. More particularly, this can include carefully crafting an input prompt to guide a model towards generating desired output. For example, the prompt can be designed to guide the model towards generating a relevance score that accurately reflects the relevance of the information retrieved. (step 310). The system responds by providing a relevance score, referred to as the second relevance score, and is a measure representing how closely the information retrieved matches the query. Once the score is received, it is captured and stored (step 312).

Figure 4:
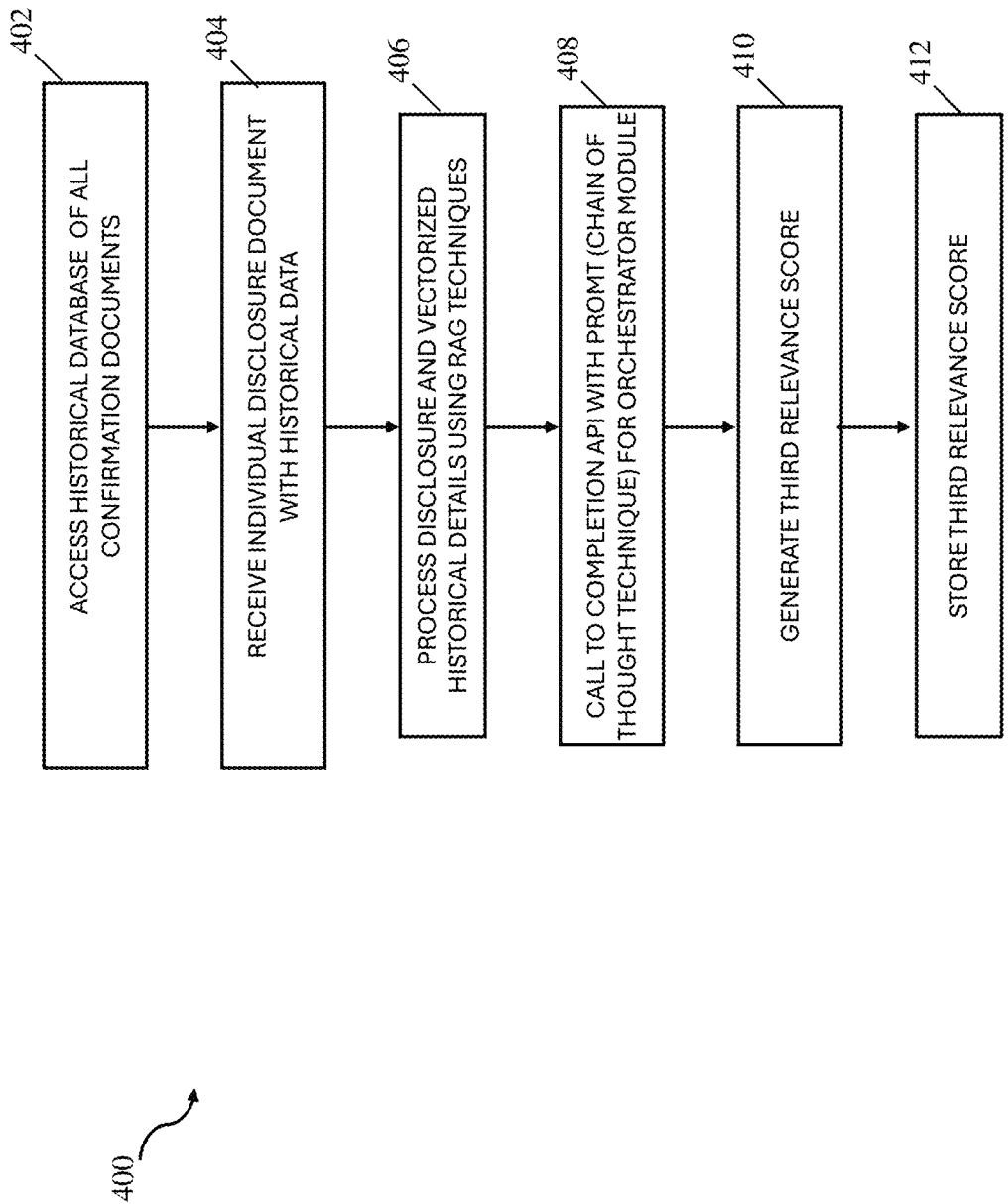
FIG. 4 shows a process flow illustrating steps associated with providing trade sample information along with historical transactions data and generating a third relevance score.

FIG. 4 shows a process flow 400 illustrating steps associated with providing trade sample information along with historical transactions data to an orchestrator module 108 to generate a third relevance score. A historical database of confirmation documents is accessed (step 402). Thereafter, individual trade disclosure and vectorized historical data associated with confirmation documents that have been fetched over the past several years are processed (step 404). This historical data comprises all the disclosures generated for trade confirmations that exist to date in production. The individual trade disclosure and the vectorized historical data are processed, for example by utilizing a Retrieval-Augmented Generation (RAG) technique (step 406). The orchestrator module 108 can facilitate invoking the call to the completion API and a question is posed to the orchestrator module 108 (step 408). In response, a third relevance score representing the relevance of the information retrieved in relation to the individual trade disclosure and the historical data is generated (step 410). This third relevance score is stored (step 412). This process ensures that relevant and accurate information is used in the subsequent steps of the process, including by using historical data in combination with the RAG technique to allow for a more comprehensive and accurate assessment of trade confirmations.

Figure 5:
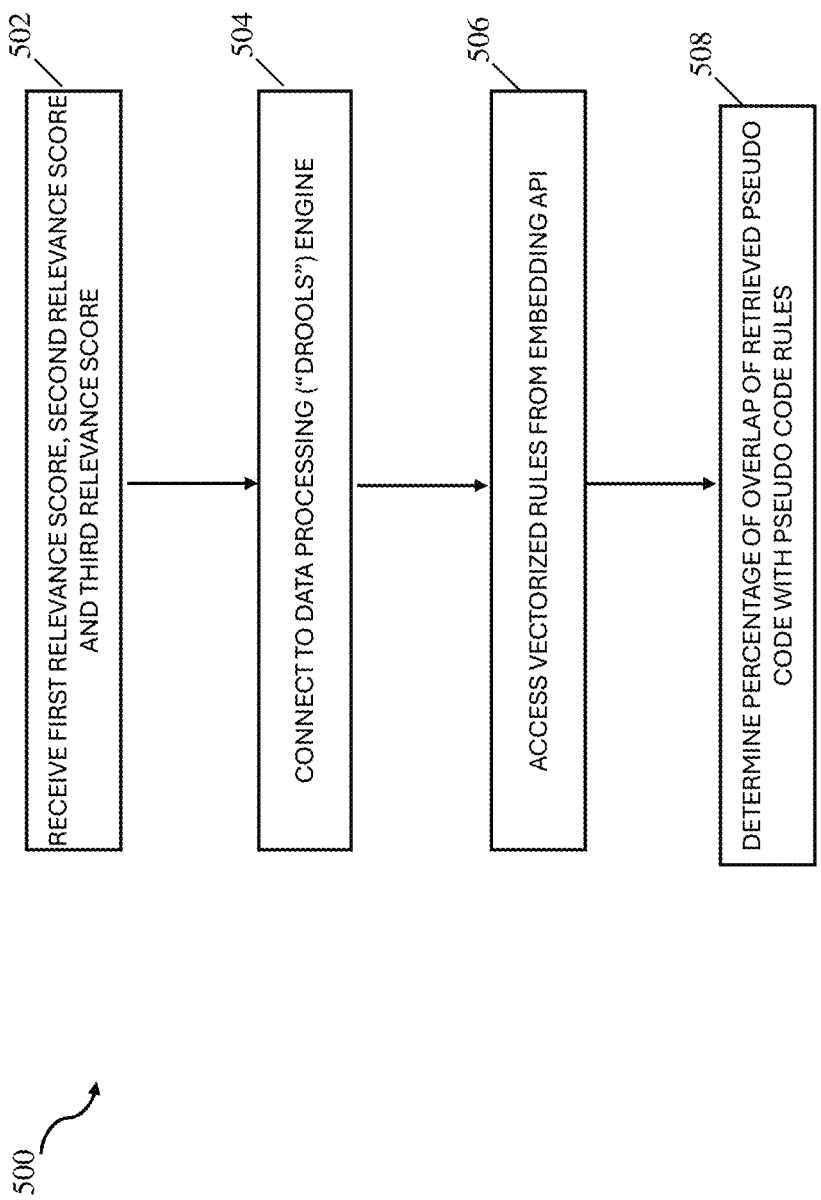
FIG. 5 shows a process flow illustrating steps associated with processing information to identify the degree of overlap of rules and representing a final relevance score.

FIG. 5 shows a process flow 500 illustrating steps associated with processing information to identify the degree of overlap of rules, generally referred to herein as an "overlap percentage" and representing a final relevance score. At step 502, the output of the first relevance score, the second relevance score, and the third relevance score are received. As noted herein, these scores represent relevance of the information received in relation to the trade information, the product and account details combined with the organization's knowledge base, and the individual trade disclosure combined with historical data, respectively. In operation, the harmonizer module 110 accesses a data processing engine (e.g., a DROOLS rule engine) and accesses and matches one or more rules sets, data objects within disclosure data, and corresponding pseudo code. The data processing engine can include a confirmation document rule set, as well as respective data objects with the confirmation document disclosure data, and the pseudo code for the data processing engine, which can include set of instructions that guide the operation of the data processing engine.

More particularly, the present disclosure provides for statistical and accurate assessment of the relevance of information retrieved in accordance with the processes shown and described herein. Information, such as associated with the disclosure document, product type, and account type set forth in an organization's knowledge base can be obtained and respective weighting factors (e.g., percentage values) of the scores derived therefrom can be adjusted to generate an accurate and relevant final disclosure relevance score. In one or more implementations of the present disclosure, the harmonizer module 110 works in conjunction with the score aggregator module 112, which includes one or more programming instructions executing on one or more processors to aggregate at least some of the first relevance score, the second relevant score, and the third relevance score using as a function of a dynamic weightage algorithm. The dynamic weightage algorithm determines a weighted average score based on computational capabilities of, for example, the harmonizer module 110, as shown and described herein.

Continuing with reference to FIG. 5, the harmonizer module 110 connects to a data processing (e.g., DROOLS) engine (step 504). The harmonizer module 110 can operate to access vectorized rules via an embedding API (step 506).

Once the rules are accessed, the harmonizer module 110 can operate to evaluate an overlap percentage between the pseudo code determined by the rules derived from the input disclosure and the rule set present in the data processing engine (step 508). The pseudo code against all disclosures can be available in the DROOLS engine. Depending on the input disclosure, the respective pseudo code can be compared against all the remaining pseudo codes to identify, for example, the top relevant pseudo code pairs. In one or more implementations, the relativeness of the search of the vectorized pseudo codes is performed using cosine similarity. Thereafter, the pseudo code pairs are calculated for overlap using the completion API. All the pseudo codes can be vectorized using the embedding API. This overlap percentage is a measure of how closely the rules from the input disclosure match the rules in the rule set. This indicates that the information retrieved closely matches the query, considering the individual trade disclosure combined with the historical data. Accordingly, the process flow 500 shown in FIG. 5 includes steps associated with processing information using computational capability to determine a final disclosure relevance score are shown.

Figure 6:
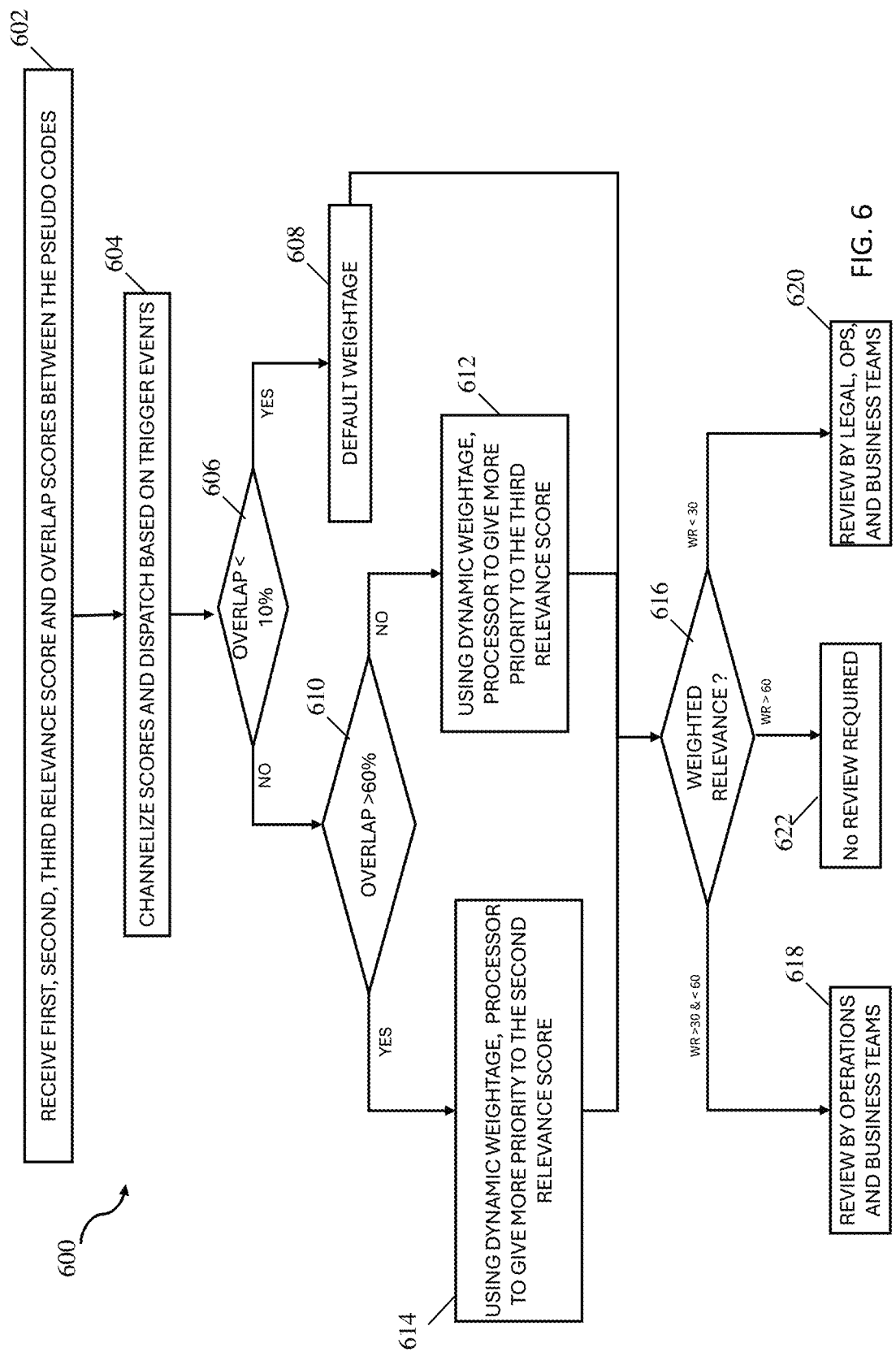
FIG. 6 shows a process including additional details in connection with the process illustrated in FIG. 5.

FIG. 6 shows a process including additional details in connection with the process 500 illustrated in FIG. 5. The example steps illustrated in FIG. 6 includes processing results from processes shown and described with respect to FIGS. 2-4 are integrated to derive a disclosure relevance score representing a determination of a code overlap score based on certain conditions and referred to herein, generally, as an overlap score. At step 602, the first relevance score, the second relevance score, and the third relevance score representing the relevance of the information retrieved in relation to the trade information, the product and account details combined with the organization's knowledge base, and the individual trade disclosure combined with the historical data, respectively, are received.

In one or more implementations of the present disclosure, the overlap percentage represents a degree of overlap of the pseudo code retrieved from individual disclosure rules based on the user's input with the rules pseudo code available in the data processing engine (e.g., the DROOLS rule engine). The data processing engine can collectively include a rule set, as well as data objects associated with information provided in a disclosure document, and pseudo code for the data processing engine. The overlap percentage value is determined based thereon. In various instances, one or more processors can assign a value of one more of the respective relevance scores (e.g., the first relevance score, the second relevance score, and/or the third relevance scores). For example, if the overlap percentage is greater than 60%, a value of "High" can be assigned for the second relevance score. This setting can indicate that the retrieved trade information closely matches the query, in view of information representing the product, account and disclosure details retrieved from the knowledge base lookup and combined with rules set retrieved by the data processing engine. Continuing with this example, the high ranking represents that the second relevance score carries the most weight in determining the final disclosure relevance score. Continuing with this example, the third relevance score can be assigned a ranking of medium and first relevance score is assigned a low ranking, indicating that the first and second relevance scores carry less weight in the determining final score.

In another example, in case the overlap percentage value is below 60%, the third relevance score can be assigned a value of "high," which represents the information retrieved closely matches the query, considering information set forth in the disclosure document and trade parameters retrieved from an organization's historical data in combination with the rules set uncovered by the data processing engine. In this example, the third relevance score is given a high ranking, indicating that it carries the most weight in determination of the final score. Moreover, the second relevance score can be assigned a ranking of "medium," and the first relevance score assigned a ranking of "low," indicating that these scores carry less weight in the final score. In operation, the final disclosure relevance score can be determined, for example, based on a dynamic weightage algorithm. This score is a weighted average of the three individual scores, considering the rankings assigned to each score based on the conditions outlined herein.

Continuing with reference to FIG. 6, after the first, second, and third relevance scores are received in step 602, conditions such as described herein are processed, such as by the harmonizer module 110 via the weighted average score algorithm. At step 604, the respective relevance scores are channelized, such as by the dispatcher module 106, and transmitted based on certain trigger events. Such trigger events can be determined by a weighted relance ("WR"), as calculated using the dynamic weightage algorithm. The WR can represent a measurement of how closely information retrieved matches the query, considering a variety of factors, including information described herein including from the disclosure document, product type, and account type.

Continuing with reference to FIG. 6, at step 606 a determination is made whether the WR, representing overlap is less than 10%. If so, then the process branches to step 608 and a default weightage value is applied. Alternatively, if the determination in step 606 is that the overlap is not less than 10%, then the process branches to step 610 and a determination is made whether the overlap is greater than 60%. If the outcome in step 606 is negative, then the process branches to step 612 and the processor uses dynamic weightage to provide more priority to the third relevance score. Alternatively, if the determination at step 610 is affirmative, then the process branches to step 614 and, using dynamic weightage, the processor gives more priority to the second relevance score.

Thereafter, the process continues from steps 608, 612, and 614, to step 616 and a determination is made whether the WR is greater than 30% but less than or equal to 60%. In such case, the process branches to step 618 an instruction is executed by one or more computing devices directing the disclosure to be reviewed by the personnel in operations and business teams. This is because the trade information and individual trade disclosures partially match the historical data and the organization's knowledge base, but not to a sufficient degree to proceed without further review. In one or more implementations of the present disclosure, computing devices associated with individuals in the operations and business teams provide trade and/or disclosure details to ensure accuracy and compliance with organization policies and procedures.

Continuing with reference to FIG. 6, if the outcome of the determination in step 616 is the WR is less than or equal to 30%, then the process branches to step 620 and an instruction is executed by one or more computing devices directing the disclosure to be reviewed by the personnel in legal, operations and business teams. This is because the trade information and individual trade disclosures do not closely match the historical data and the organization's knowledge base. The legal team's involvement ensures that the trade complies with all legal and regulatory requirements, while the operations and business teams ensure that the trade details and disclosure are accurate and in line with the organization's policies and procedures. Alternatively, if the determination at step 616 is that the WR is greater than 60%, then the process branches to step 622 and no further review is deemed to be required. Thereafter, a weighted average is applied to the overlap score as a weighted relevance.

Accordingly, and in connection with the outcomes set forth in FIGS. 2-6, a highly statistical assessment of accuracy and relevance in connection with disclosure document information processed is provided. This is effected by the harmonizer module 110 evaluating, for example, the disclosure document, the product type, and account type in an organization's knowledge base, and by adjusting weightage of the scores accordingly to generate a disclosure relevance score. The harmonizer module 110 can work in conjunction with the score aggregator module, which aggregates these relevance scores using the dynamic weightage algorithm. This algorithm determines a weighted relevance (WR) based on the harmonizer module's 110 computational capability.

Figure 7:
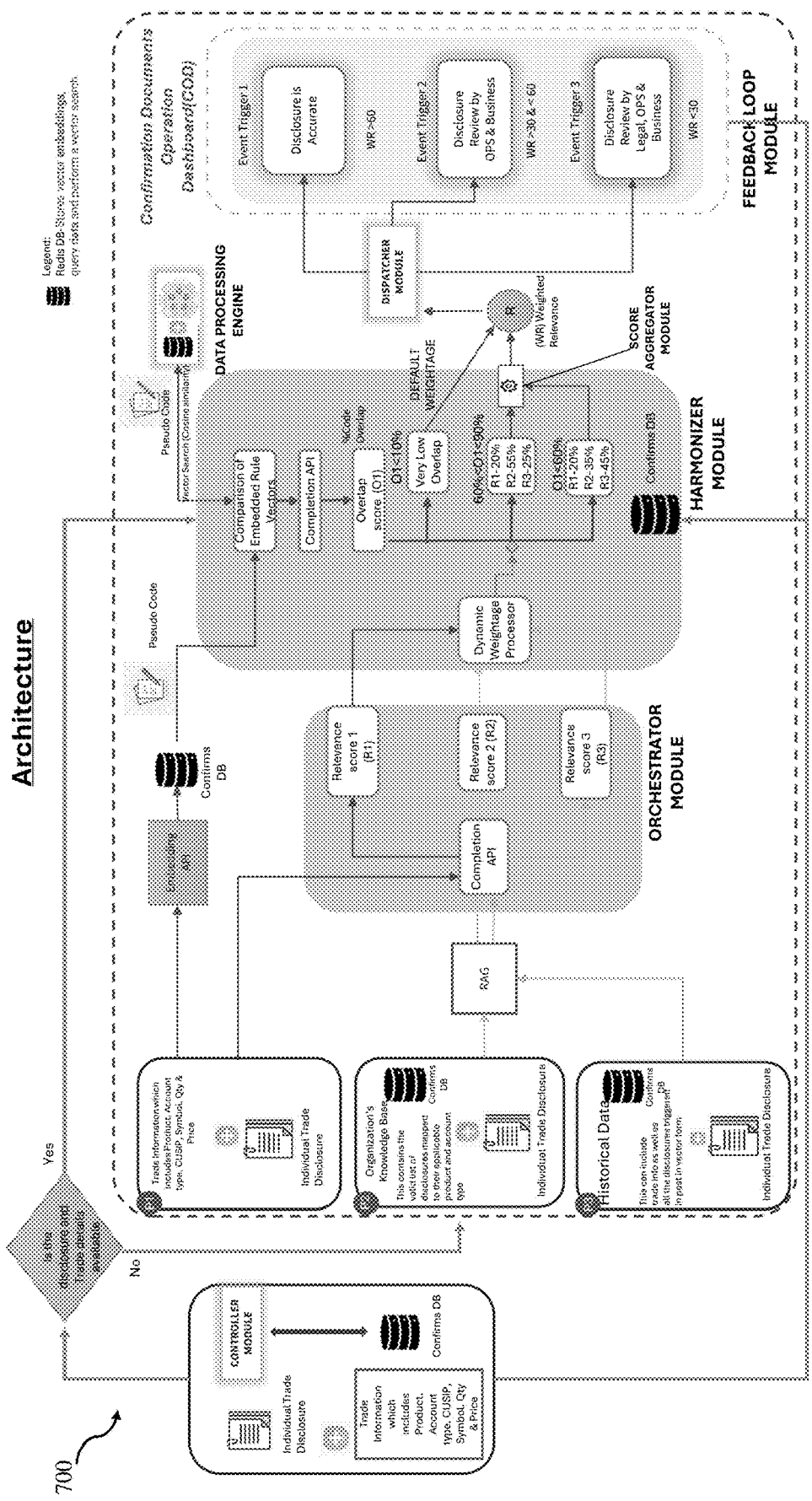
FIG. 7 is a system diagram illustrating example components of the present disclosure, including an orchestrator module, harmonizer module, feedback module, and data processing engine, as well as respective processes executing thereby or therewith.

FIG. 7 is a system diagram illustrating example components of the present disclosure, including the orchestrator module 108, the harmonizer module 110, the feedback module 114, and data processing engine, as well as respective processes executing thereby or therewith. An individual trade disclosure document, which can include information associated with a plurality of trade disclosures, is received. Each respective disclosure in the disclosure document is assessed for relevance, accuracy, and completeness. For example, individual disclosure language is identified and matched with information stored in one or more databases. For example, transaction details can include information representing product name, type of account, CUSIP, symbol, quantity, and price. Further, a determination is made whether the disclosure and trade details are available. If the determination is negative, then three processes (P1, P2, and P3) are included.

Information associated with the disclosure language can be provided to prompt a model for analysis and provide a score. In the example shown in FIGS. 7, P1, P2, and P3 are included to illustrate respective prompts that are provided to at least one model. At P1, trade information, such as product, account type, CUSIP, symbol, quantity and price are obtained via the individual disclosure document. The outcome of P1 results in a call made to an embedding API and pseudo code from a database is accessed. Further, the outcome of P1 flows to the orchestrator module 108, which includes a call to a completion API, and used to generate relevance scores. At P2, information from the organization's knowledge base is accessed, for example, via a vector database, and a list of disclosures mapped to the applicable product and account type is combined with information in the individual disclosure document. The outcome of P2 results in a RAG technique, which is forwarded to the orchestrator module 108 and the completion API. At P3, historical data, for example, stored in a vector database is combined with information in the individual disclosure document. The outcome of P3 results in a RAG technique, which is forwarded to the orchestrator module and the completion API.

As noted here, the outcome of the completion API results in creation of the first relevance score, the second relevance score, and the third relevance score. The first, second, and third relevance scores are passed to a dynamic weightage processor, which is further compared against the overlap score O1 which, as noted herein, represents the percentage of pseudocode overlap. Also shown in FIG. 7, a data processing engine (e.g., DROOLS engine) provides pseudocode that is used in a comparison of embedded rules vectors to determine the percentage of code overlap, thereby generating the overlap score O1. Thereafter, the harmonizer module 110 analyzes the values associated with the fourth relevance score. If the overlap score O1 is below 10%, representing very low overlap, then no further action is required and a default weightage (e.g., R1-20%, R2-30%, and R3-50%) can be used. Otherwise, the harmonizer module 110 applies a dynamic weightage algorithm to generate weighted relevance for the overlap score O1 before passing the weighted relevanace to the dispatcher module 106. Thereafter, information is provided, such as via the feedback loop module 114 and a respective graphical user interface (e.g., a confirmation document operation dashboard ("COD"), in connection with respective event triggers (1, 2, or 3). For example, event trigger 1 results in providing information representing the disclosure document is accurate. Event trigger 2 results in providing information representing the disclosure document needs to be reviewed by operation and business teams. Event trigger 3 results in providing information representing the disclosure document needs to be reviewed by legal, operation, and business teams.

In one or more implementations of the present disclosure, values such as shown and described herein representing relevance and accuracy of confirmation documents can be provided via a confirmation document operation dashboard. Various graphical screen controls can be included in the dashboard to enable functionality, such as to hold a confirmation document, release the confirmation document, enable auto-release functionality, auto-hold functionality, or other design specific options. Such operations can preclude inaccurate and/or irrelevant information being distributed in respective confirmation documents.

Accordingly, as shown and described herein, different knowledge sources, including model specific knowledge, historical patterns, or other sources can be accessed and used to determine overlap of rules. Inputs can be analyzed dynamically to assess overall relevance indices and the relevance of disclosure information and scores can be generated that are suable to trigger respective workflows. Information can be provided representing accuracy and relevance of disclosure confirmation documents, which can be transmitted automatically to respective devices to notify all who need to be involved. Moreover, in one or more implementations of the present disclosure, disclosure language to be included in a confirmation document can be automatically suggested or added to the confirmation document. Alternatively (or in addition), language that is deemed inaccurate or irrelevant can be automatically suppressed, such as via one or more controls provided in a confirmation document dashboard.

Moreover, the present disclosure stores information in the form of vectors that can be accessed via, for example, an embedding API. Such information can represent products, accounts, CUSIP, symbols, or virtually any data a disclosure contains. Pseudo code for respective disclosures associated with respective rules defined for confirmation documents can be accessed and compared with pseudo code associated with a respective disclosure, and degrees of accuracy and relevance determined thereby.

Figure 8:
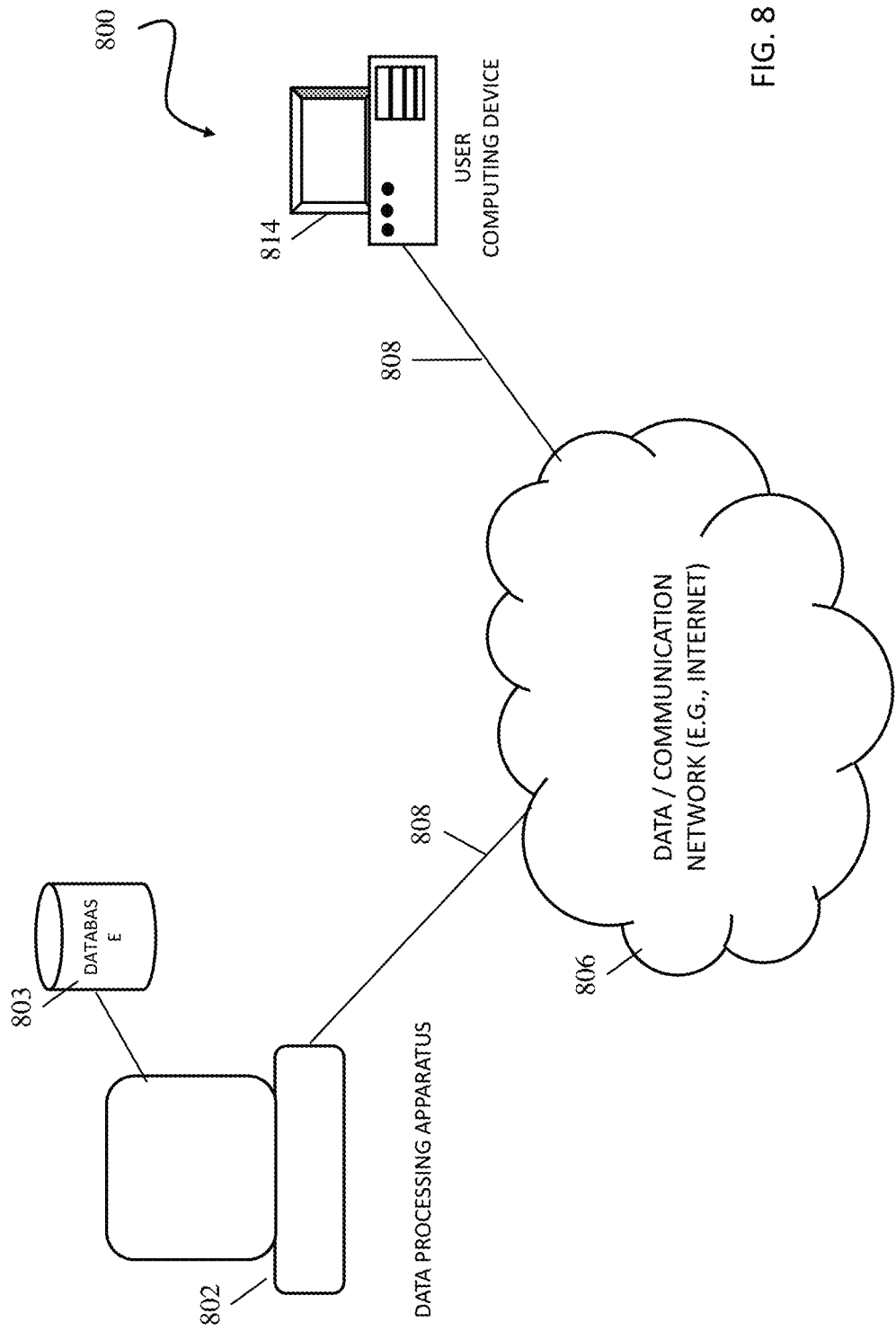
FIG. 8 shows an example information processor and/or user computing device that can be used to implement the techniques described herein.

Referring to FIG. 8, a diagram is provided that shows an example hardware arrangement that is configured for providing the systems and methods disclosed herein and designated generally as system 800. System 800 can include one or more information processors 802 that are at least communicatively coupled to one or more user computing devices 804 across communication network 806. Information processors 802 and user computing devices 804 can include, for example, mobile computing devices such as tablet computing devices, smartphones, personal digital assistants or the like, as well as laptop computers and/or desktop computers, server computers and mainframe computers. Further, one computing device may be configured as an information processor 802 and a user computing device 804, depending upon operations being executed at a particular time.

With continued reference to FIG. 8, information processor 802 can be configured to access one or more databases 803 for the present disclosure, including source code repositories and other information. However, it is contemplated that information processor 802 can access any required databases via communication network 806 or any other communication network to which information processor 802 has access. Information processor 802 can communicate with devices comprising databases using any known communication method, including a direct serial, parallel, universal serial bus ("USB") interface, or via a local or wide area network.

User computing devices 804 can communicate with information processors 802 using data connections 808, which are respectively coupled to communication network 806. Communication network 806 can be any data communication network. Data connections 808 can be any known arrangement for accessing communication network 806, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 804 preferably have the ability to send and receive data across communication network 806, and are equipped with web browsers, software disclosures, or other means, to provide received data on display devices incorporated therewith. By way of example, user computing device 804 may be personal computers such as Intel Pentium-class and Intel Core-class computers or Apple Macintosh computers, tablets, smartphones, but are not limited to such computers. The hardware arrangement of the present invention is not limited to devices that are physically wired to communication network 806, and that wireless communication can be provided between wireless devices and information processors 802.

System 800 preferably includes software that provides functionality described in greater detail herein, and preferably resides on one or more information processors 802 and/or user computing devices 804. One of the functions performed by information processor 802 is that of operating as a web server and/or a web site host. Information processors 802 typically communicate with communication network 806 across a permanent i.e., un-switched data connection 808. Permanent connectivity ensures that access to information processors 802 is always available.

FIG. 9 shows an example information processor 802 and/or user computing device 804 that can be used to implement the techniques described herein. The information processor 802 and/or user computing device 804 is intended to represent various forms of digital computers, such as laptops, desktops, workstations, personal digital assistants, servers, blade servers, mainframes, and other appropriate computers. The components shown in FIG. 9, including connections and relationships, and their functions, are meant to be exemplary only, and are not meant to limit implementations of the inventions described and/or claimed in this document.

As shown in FIG. 9, the information processor 802 and/or user computing device 804 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the information processor 802 and/or user computing device 804, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the information processor 802 and/or user computing device 804. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the information processor 802 and/or user computing device 804. In some implementations, the storage device 906 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 can be configured to manage bandwidth-intensive operations, while the low-speed interface 912 can be configured to manage lower bandwidth-intensive operations. Of course, one of ordinary skill in the art will recognize that such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In an implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Any of the methods described herein may, in corresponding embodiments, be reduced to a non-transitory computer readable medium (CRM, such as a disk drive or flash drive) having computer instructions stored therein that, when executed by a processing circuit, cause the processing circuit to carry out an automated process for performing the respective methods.

It is to be recognized herein that the present disclosure provides for significant technological improvements in the art, including by increasing efficiency of one or more computing platforms, including individual computing devices and distributed computing systems. The present disclosure includes options for upscaling and downscaling configuration options in accordance with respective conditions and implementations. Respective process flows can be downgraded, throttled back, or scaled in accordance with information value-based particle swarm algorithm operations. For example, by optimizing the exchange of information, increasing or decreasing propagation of information, changing information value, optimizing historical stored positions, changing particle group assignments, and optimizing randomization, as shown and described herein, computer resources are optimized, thereby improving the function of the machine, per se.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for assessing relevance and accuracy of confirmation documents with respect to disclosure materials associated with completed activity, the method comprising:
   receiving, by at least one computing device configured by executing programming instructions stored on non-transitory processor readable media, electronic information associated with a confirmation document, wherein the confirmation document includes information representing at least one transaction disclosure;
   generating, by the at least one computing device processing the electronic information associated with the confirmation document, a first query to be transmitted to at least one first model;
   calculating, by the at least one computing device, a first relevance score representing a correlation of the electronic information associated with the confirmation document with information received from the at least one first model in response to the transmitted first query;
   accessing, by the at least one computing device, knowledge base information stored in at least one database associated with each of a plurality of transaction disclosures corresponding to the electronic information associated with the confirmation document;
   generating, by the at least one computing device processing the knowledge base information and the electronic information associated with the confirmation document, a second query to be transmitted to at least one second model;
   calculating, by the at least one computing device, a second relevance score representing a correlation of the electronic information associated with the confirmation document with information received from the at least one second model in response to the transmitted second query;
   accessing, by the at least one computing device, historical information stored in at least one database associated with each of a plurality of historical records corresponding to the electronic information associated with the confirmation document;
   generating, by the at least one computing device processing the historical information and the electronic information associated with the confirmation document, a third query to be transmitted to at least one third model;
   calculating, by the at least one computing device, a third relevance score representing a correlation of the electronic information associated with the confirmation document with information received from the at least one third model in response to the transmitted third query;
   assigning, by the at least one computing device, respective weighting factors to each of the first relevance score, the second relevance score, and the third relevance score;
   aggregating, by the at least one computing device, the respectively weighted first, second, and third relevance scores to generate a weighted relevance;
   generating, by the at least one computing device as a function of the weighted relevance, information representing at least one of relevance and accuracy of the confirmation document; and
   transmitting, by the at least one computing device, the generated information representing the least one of relevance and accuracy of the confirmation document to at least one other computing device.

2. The method of claim 1, wherein generating at least one of the first query, the second query, and the third query includes retrieval-augmented generation and prompt engineering.

3. The method of claim 1, wherein generating at least one of the first relevance score, the second relevance score, the third relevance score, and an overlap score further includes:
   accessing, by the at least one computing device, at least one database storing rules sets associated with respective transaction disclosures; and
   matching, by the at least one computing device, at least one rule set and corresponding pseudo code in response to information received in response to determining, by the at least one computing device, a degree of overlap of matched rules and rules associated with information in the confirmation document.

4. The method of claim 3, wherein the at least one database storing rules is a DROOLS engine.

5. The method of claim 1, wherein assigning the respective weighting factors represents relative rankings of the first relevance score, the second relevance score, and the third relevance score with respect to the information in the confirmation document.

6. The method of claim 1, wherein the generated information representing the at least one of relevance and accuracy of the confirmation document includes a directive representing:
   no further evaluation of the confirmation document is needed;
   review by an operations team and a business team is needed; or
   review by an operations team, a business team, and a legal team is needed.

7. The method of claim 1, further comprising:
   receiving feedback, by the at least one computing device in response to the generated information representing the at least one of relevance and accuracy of the confirmation document; and
   updating, by the at least one computing device using the received feedback, at least one of the at least one first model, the at least one second model, and the at least one third model.

8. The method of claim 1, wherein at least one of the first query, the second query, and the third query comprises vectors.

9. The method of claim 1, wherein the at least one transaction disclosure includes information representing at least one of a product, account type, CUSIP, symbol, quantity, and price.

10. The method of claim 1, wherein the knowledge base information includes a list of transaction disclosures mapped to applicable products and account types.

11. The method of claim 1, wherein the historical information is formatted in vectors.

12. The method of claim 1, further comprising providing, by the at least one computing device, an interactive dashboard comprising at least one graphical screen control including information associated with the relevance and accuracy of the confirmation document.

13. A computer-implemented system for assessing relevance and accuracy of confirmation documents with respect to disclosure materials associated with completed activity, the system comprising:
- at least one computing device configured by executing programming instructions stored on non-transitory processor readable media for:
  - receiving electronic information associated with a confirmation document, wherein the confirmation document includes information representing at least one transaction disclosure;
  - generating, by processing the electronic information associated with the confirmation document, a first query to be transmitted to at least one first model;
  - calculating a first relevance score representing a correlation of the electronic information associated with the confirmation document with information received from the at least one first model in response to the transmitted first query;
  - accessing knowledge base information stored in at least one database associated with each of a plurality of transaction disclosures corresponding to the electronic information associated with the confirmation document;
  - generating, by processing the knowledge base information and the electronic information associated with the confirmation document, a second query to be transmitted to at least one second model;
  - calculating a second relevance score representing a correlation of the electronic information associated with the confirmation document with information received from the at least one second model in response to the transmitted second query;
  - accessing historical information stored in at least one database associated with each of a plurality of historical records corresponding to the electronic information associated with the confirmation document;
  - generating, by processing the historical information and the electronic information associated with the confirmation document, a third query to be transmitted to at least one third model;
  - calculating a third relevance score representing a correlation of the electronic information associated with the confirmation document with information received from the at least one third model in response to the transmitted third query;
  - assigning respective weighting factors to each of the first relevance score, the second relevance score, and the third relevance score;
  - aggregating the respectively weighted first, second, and third relevance scores to generate a weighted relevance;
  - generating, as a function of the weighted relevance, information representing at least one of relevance and accuracy of the confirmation document; and
  - transmitting the generated information representing the least one of relevance and accuracy of the confirmation document to at least one other computing device.

14. The system of claim 13, wherein generating at least one of the first query, the second query, and the third query includes retrieval-augmented generation and prompt engineering.

15. The system of claim 13, wherein generating at least one of the first relevance score, the second relevance score, the third relevance score, and an overlap score further includes:
- accessing at least one database storing rules sets associated with respective transaction disclosures; and
- matching at least one rule set and corresponding pseudo code in response to information received in response to determining a degree of overlap of matched rules and rules associated with information in the confirmation document.

16. The system of claim 15, wherein the at least one database storing rules is a DROOLS engine.

17. The system of claim 15, wherein assigning the respective weighting factors represents relative rankings of the first relevance score, the second relevance score, and the third relevance score with respect to the information in the confirmation document.

18. The system of claim 15, wherein the generated information representing the at least one of relevance and accuracy of the confirmation document includes a directive representing:
- no further evaluation of the confirmation document is needed;
- review by an operations team and a business team is needed; or
- review by an operations team, a business team, and a legal team is needed.

19. The system of claim 15, wherein the at least one computing device is further configured for:
- receiving feedback, in response to the generated information representing the at least one of relevance and accuracy of the confirmation document; and
- updating, using the received feedback, at least one of the at least one first model, the at least one second model, and the at least one third model.

20. The system of claim 15, wherein at least one of the first query, the second query, and the third query comprises vectors.

* * * * *